United States Patent [19]

Newman

[11] 4,222,332
[45] Sep. 16, 1980

[54] TRUCK MOUNTED RAILROAD CRANE MAIN BED FRAME

[76] Inventor: Timothy L. Newman, 700 N. Liberty, Jerseyville, Ill. 62050

[21] Appl. No.: 911,597

[22] Filed: Jun. 1, 1978

[51] Int. Cl.² ................................................. B60F 1/04
[52] U.S. Cl. ............................. 105/215 C; 105/199 C
[58] Field of Search ................ 296/28 R; 280/106 R; 105/215, 199 R, 199 C, 420, 183, 211, 215 C; 213/57

[56] References Cited

U.S. PATENT DOCUMENTS

| | | | |
|---|---|---|---|
| 1,656,995 | 1/1928 | Wentel | 105/183 |
| 2,242,422 | 5/1941 | Eksergian | 105/182 R |
| 3,082,702 | 3/1963 | Mohr, Jr. | 105/199 C |
| 3,263,628 | 8/1966 | Grove et al. | 105/215 C |
| 3,269,331 | 8/1966 | Thompson | 105/215 C |
| 3,581,671 | 6/1971 | Haet | 105/215 C |
| 3,633,514 | 1/1972 | Deike | 105/215 C |
| 3,701,323 | 10/1972 | Coy | 105/215 C |
| 4,086,856 | 5/1978 | Chenoweth | 105/215 C |

*Primary Examiner*—Richard A. Bertsch
*Attorney, Agent, or Firm*—Michael Kovac

[57] ABSTRACT

A main bed frame for a truck mounted railroad crane is disclosed as having an inner supporting frame section separating a paid of outer supporting frame sections, all of which underlie and support the upper main bearing plate upon which a swiveling crane is mounted.

4 Claims, 6 Drawing Figures

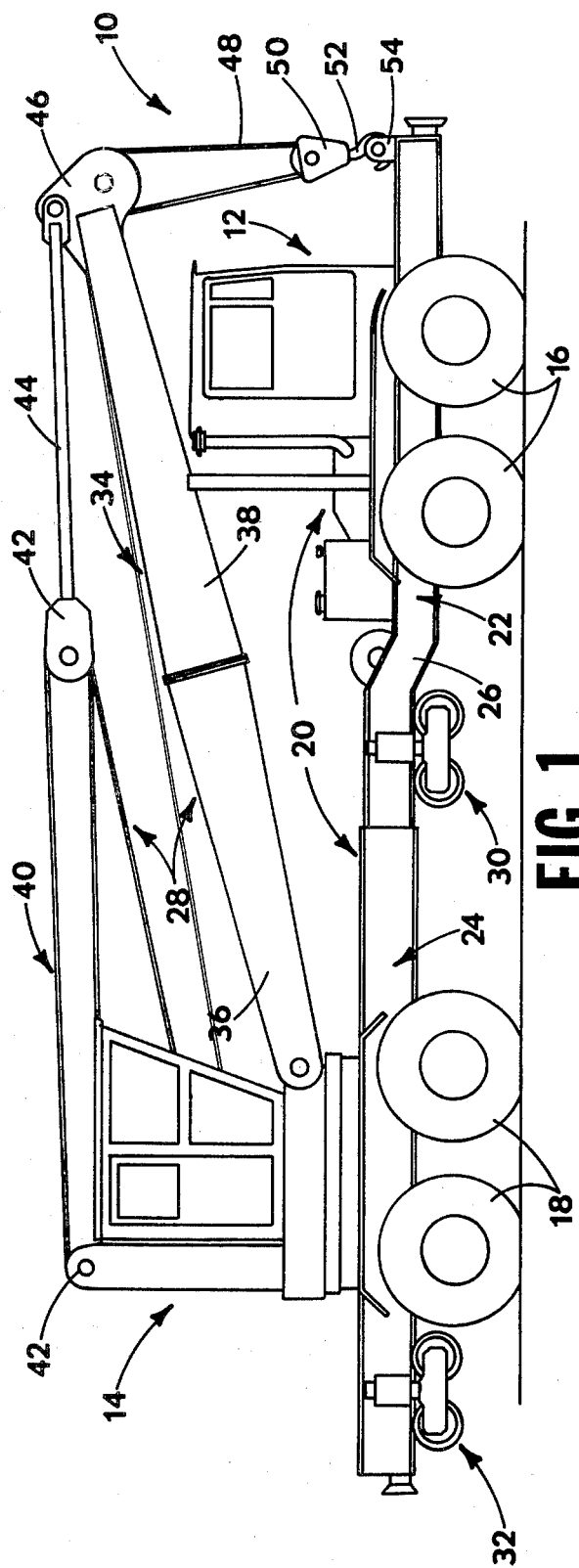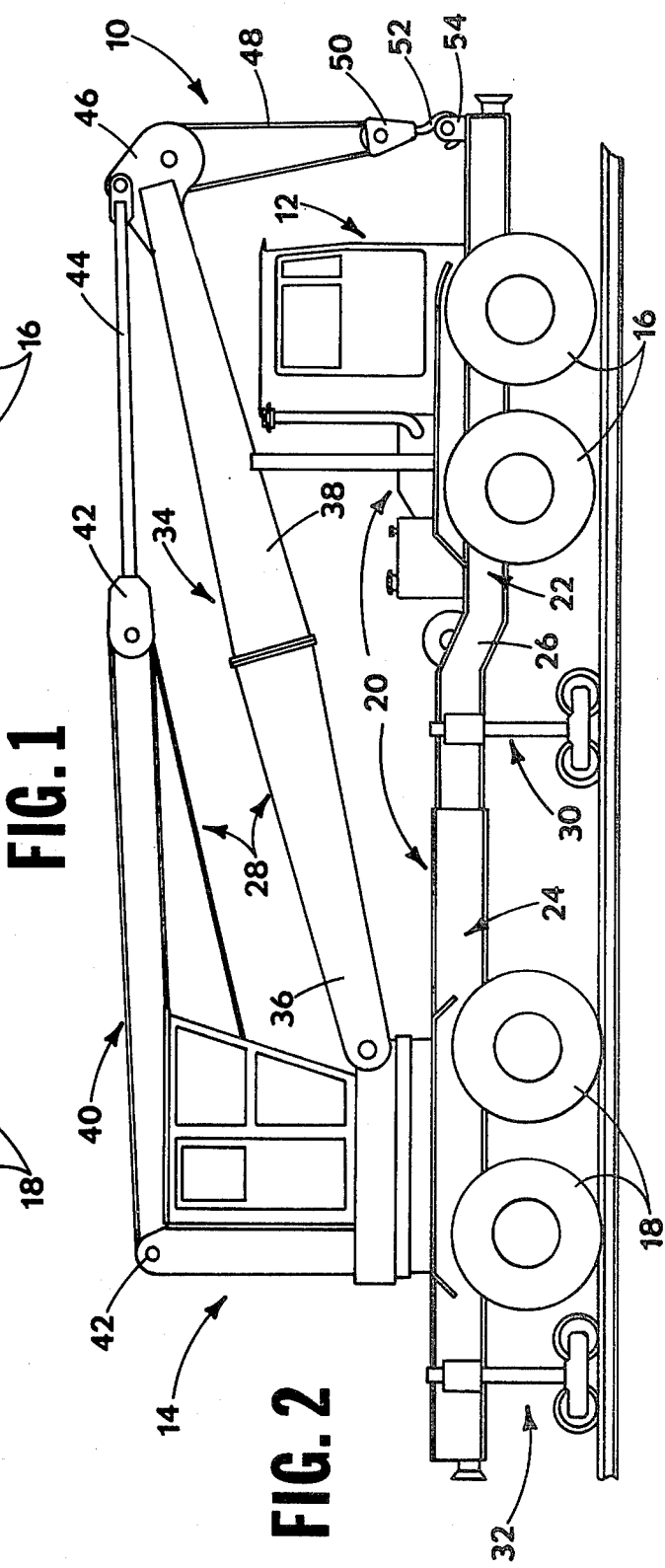

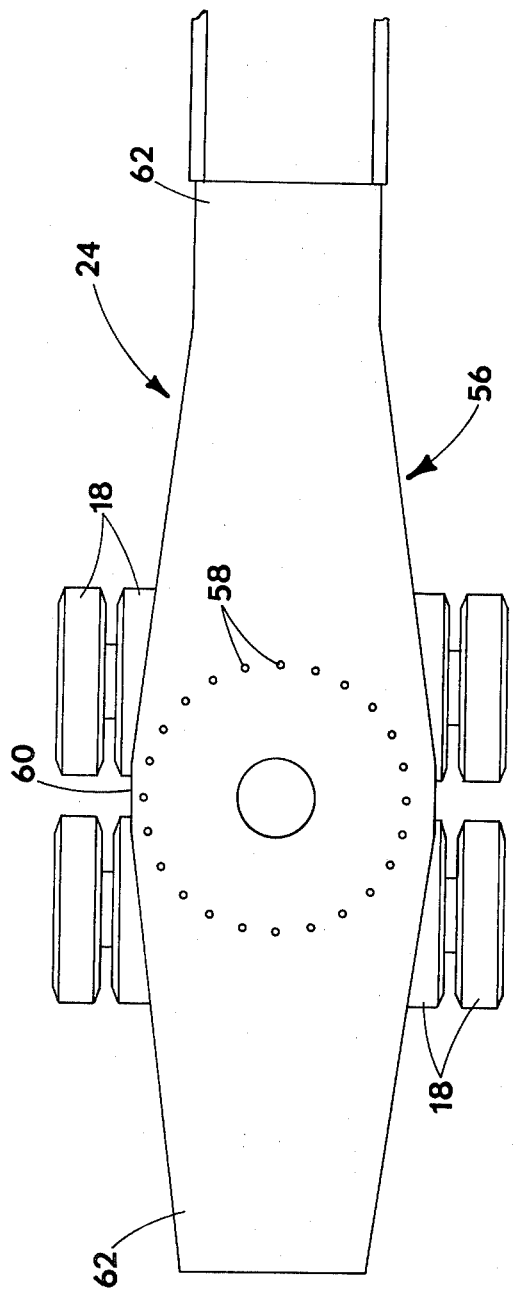
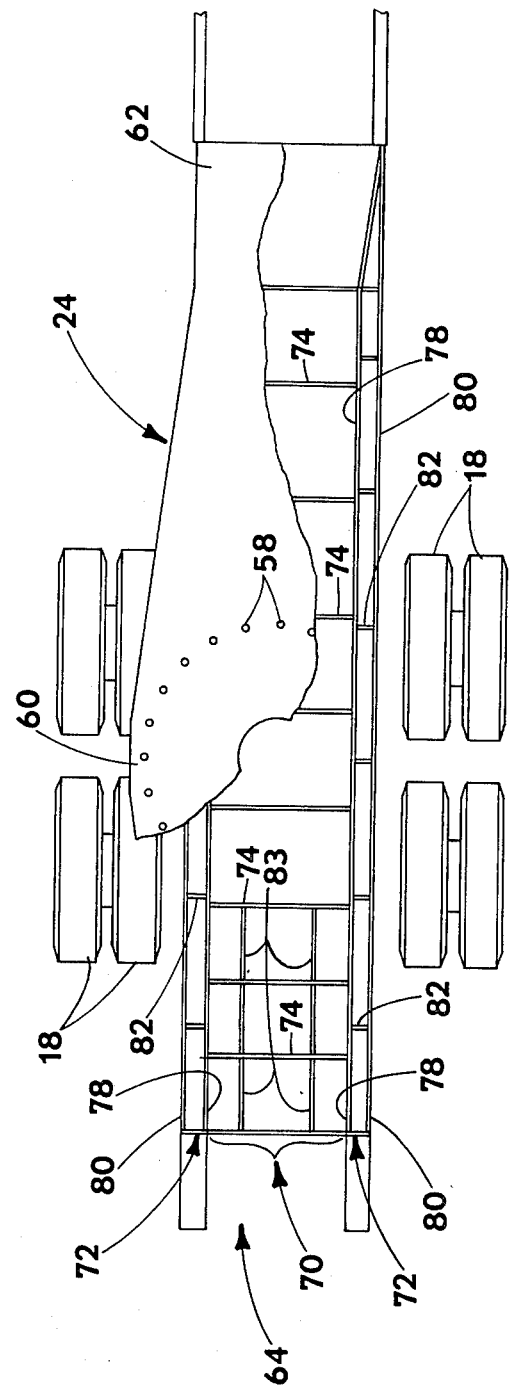

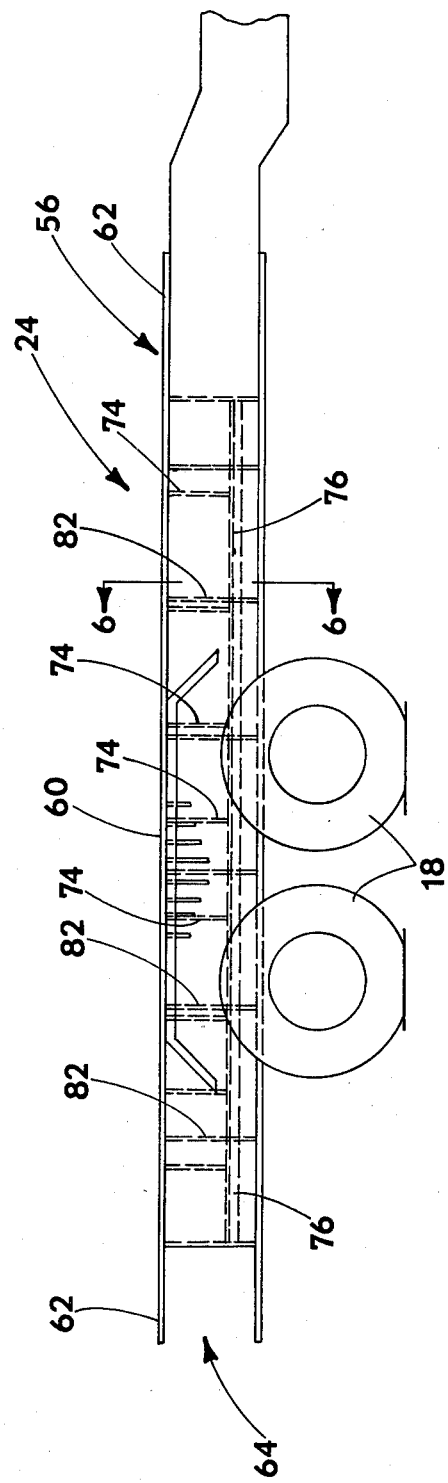
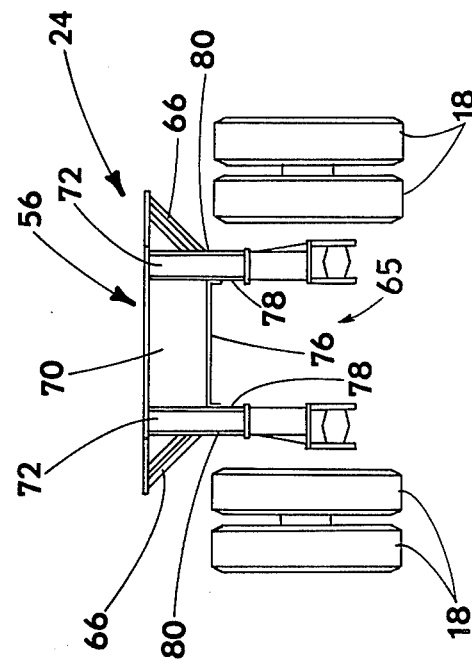

TRUCK MOUNTED RAILROAD CRANE MAIN BED FRAME

SUMMARY OF THE INVENTION

This application is related to my following copending applications: Ser. No. 911,627 filed June 1, 1978 entitled "TRUCK MOUNTED RAILROAD CRANE BOOM SECTION", Ser. No. 911,637 filed June 1, 1978 entitled "TRUCK MOUNTED RAILROAD CRANE RAIL GEAR ASSEMBLY"; and Ser. No. 911,638 filed June 1, 1978 entitled "TRUCK MOUNTED RAILROAD CRANE HYDRAULIC SWIVEL MEANS".

The present invention is in the field of truck mounted railroad cranes which are convertible highway/railway vehicles capable of highway travel on a truck chasis, as well as being convertible for travel on train rails through extensible front and rear trail rail gear, which guide the vehicle on train rails while allowing the rubber wheels of the vehicle to move the vehicle to the desired location. Such vehicles are used principally for train derailments, although they are useful for other train and rail construction and maintenance operations.

At the site of a train derailment, the truck mounted railroad crane, which has previously been driven as a truck over highways and then positioned on or adjacent tracks leading to the train derailment, is ready to reposition de-railed train cars back onto tracks from which they have become de-railed. This is achieved through the swiveling crane boom also mounted on the truck chassis. The operator of the truck mounted railroad crane positions himself in the crane cab to operate the crane controls that raise, lower and swing the crane boom for re-positioning the de-railed railcar back on train rails.

Truck mounted railroad cranes are thus versatile pieces of equipment that require both highway and railway travel, as well as operation and control of crane booms. However, such vehicles may violate state highway laws in regard to size and weight. Thus, such vehicles can be impounded by state highway patrol officers causing delays and heavy fines.

It has been determined that size and weight of truck mounted railroad cranes still do not offset the torsional and bending forces to which crane booms and the supporting frame is subjected. It has been found, for example, that the supporting frame for the crane itself can be twisted or bent when re-positioning a de-railed train car through the crane boom.

The present invention is directed to a new and improved mainbed frame design which overcomes the deficiencies of prior art designs. My other aforementioned copending applications are directed to other improvements in truck mounted railroad cranes including the crane boom design (Ser. No. 911,627 entitled "TRUCK MOUNTED RAILROAD CRANE BOOM SECTION"); train rail gear design (Ser. No. 911,637 entitled "TRUCK MOUNTED RAILROAD CRANE RAIL GEAR ASSEMBLY"); and crane swivel means (Ser. No. 911,638 entitled "TRUCK MOUNTED RAILROAD CRANE SWIVEL MEANS").

Accordingly, the present invention is directed to a new and improved main bed frame for a truck mounted railroad crane for eliminating twisting or bending of the main bed frame of the crane when the crane is operated to lift and position de-railed train cars.

Another object of the present invention is to provide a strong and relatively lightweight structural frame design for the main bed frame of a truck mounted railroad crane.

These and other objects and advantages of the present invention will become apparent from the ensuing description.

BRIEF DESCRIPTION OF THE DRAWINGS

FIG. 1 is a side elevational view of a truck mounted railroad crane, including main bed frame, which is constructed in accordance with the teachings of the present invention;

FIG. 2 is a side elevational view, similar to FIG. 1, but showing the truck mounted railroad crane convertible for travel on train rails;

FIG. 3 is a top plan view of the main bed frame of the truck mounted railroad crane;

FIG. 4 is a fragmentary top plan view of the main bed frame of the truck mounted railroad crane, showing some of the structural configurations thereof;

FIG. 5 is fragmentory side elevational view of the main bed frame with some of the structural components thereof being illustrated; and FIG. 6 is an end elevational view, of the main bed frame, as viewed along lines 5—5 of FIG. 5.

DESCRIPTION OF THE PREFERRED EMBODIMENTS

FIGS. 1 and 2 of the drawings shown my preferred design of a truck mounted railroad crane 10 which includes a truck cab 12 at the front end and a crane cab 14 at the front end and a crane cab 14 at the rear end. The truck cab 12 is mounted over the front pneumatic rubber tires 16 while the crane cab 14 is mounted over the rear pneumatic rubber tires 18. The truck cab 12 and crane cab 14 are interconnected through the vehicle frame 20 that includes a truck chassis frame 22 and crane bed frame 24. It will be seen that the truck chassis frame 22 is mounted lower than crane bed frame 24 through the angular interconnecting frame structure 26. There are several reasons for this including maintaining the crane boom superstructure 28 at the lowest possible height when traveling over highways, as shown in FIG. 1, while enabling the truck cab 12, frame 22 and tires 16 to be lifted off of railroad tracks, as shown in FIG. 2, to allow transporting of the truck mounted railroad crane 10 to the desired location over railroad tracks.

This lifting of the truck cab 12, frame 22 and tires 16 at the front end of the truck mounted railroad crane 10 is achieved by the front and rear train gear 30, 32 that are mounted on the crane bed frame 24. As seen in FIG. 1 the front and rear train gear 30, 32 respectively are maintained in a retracted position to allow the front and rear pneumatic rubber tires 16, 18 respectively to move the truck mounted railroad crane 10 over highways. However, when the desired train rail location has been reached, the truck mounted railroad crane 10 is driven into a straddle position over train rails, and the front and rear train rail gears 30, 32 respectively are lowered or extended to raise the truck cab 12, truck chassis frame 22 and front pneumatic rubber tires 16 off of the railroad tracks. This enables the front and rear train rail gears 30, 32 respectively to guide the truck mounted railroad crane over train rails, while allowing the inside pairs of wheels (as seen in FIGS. 3 - 4 and 6) of the rear pneumatic rubber tires 18 to rest upon and engage the train rails. In this way, the truck mounted railroad crane 12 is transported over train rails by the driven rear pneumatic rubber tires 18 of the truck mounted railroad crane 10.

When the truck mounted railroad crane 10 reaches the desired location, such as a train derailment, train rail construction, train rail maintenance operation, or the like, the crane boom superstructure 28 may then be put into operation to raise, lower and swing train cars and the like, as may be desired. The crane boom superstructure 28 includes a boom 34 that is hingedly mounted to the crane cab 14 for raising and lowering of the boom 34 as well as for swiveling or rotational movement of the crane cab 14 and associated boom 34 relative to the crane bed frame 24. The boom 34 comprises two sections, an inboard section 36 and an outboard section 38. The inboard section 36 is pivotally or hingedly attached to the crane cab 14 while the outboard section 38 is supported and its angular position controlled by means of the hoisting cables 40 reeved through suitable hoisting cable sheeves 42 and the connecting link 44 that extends between the outermost sheeve 42 and the fixed block sheeve 46 mounted at the free end of the outboard section 38. The fixed block sheeve 46 threadably carries a lift cable 48 which is also threaded over a load engaging block 50 that includes a hook 52. When not in use, the hook 52 is restrained by the shaft block 54 mounted at the front of the truck chassis frame 22, as seen in FIGS. 1 and 2.

With the above general description of components of the truck mounted railroad crane 10, attention is now directed to the main bed frame 24 of the crane cab 14, which is best seen in FIGS. 3-6 of the drawings, for a specific understanding of the improvements incorporated in the main bed frame 24, with which the present invention is concerned.

The main bed frame 24 incorporates a structural configuration of components which prevents bending or twisting of the main bed frame 24 when the crane cab 14 and crane boom superstructure 28 are used to raise, lower and swing rail cars and the like. This is very important since a twisted or bent supporting frame can render the truck mounted railroad crane 10 inoperative, requiring extensive costs and time to repair. Size and weight along are not determinative, but rather it has been found that a structural configuration of the components used in the main bed frame 24 can produce a favorable result over long term use.

The main bed frame 24 includes an upper main bearing plate 56 upon which the crane cab 14 and crane boom superstructure are mounted in the vicinity of the circular arranged crane cab mounting holes 58 as shown in FIGS. 3-4. As best seen in FIGS. 3-4, the upper main bearing plate 56 is widest along the central portion 60 thereof and tapers inwardly on each side of the central portion 58 to the opposite free ends thereof. The greatest stress and load for the upper main bearing plate 56 occurs when the crane boom superstructure 28 is generally parallel with the axles of the rear pneumatic rubber tires 18, and thus the upper main bearing plate 56 is widest in that area. From that position to a position where the crane boom superstructure 28 extends substantially normal to the axles of the rear pneumatic rubber tires 18, the upper main bearing plate 56 provides stress and load support to the crane boom superstructure by tapering inwardly to the opposite free ends 62 thereof, where the under supporting structure 65 for the upper main bearing plate 56 generally underlies and supports same. Accordingly, tie bar supports 66 extend between the under surface of the upper main bearing plate 56 and the under supporting structure 64 on each side thereof, as best seen in FIGS. 5-6, to structurally interconnect the overextended portions of the upper main bearing plate 56 to the under supporting structure 64 of the main bed frame 24, for additional stress and load support to the crane boom superstructure 28.

Referring now to the under supporting structure 64 for the upper main bearing plate 56, it will be seen from FIGS. 4-6, that the under supporting structure 64 includes an inner supporting frame section 70 separating a pair of outer supporting frame sections 72, 72, all of which underlie and support the upper main bearing plate 56 for substantially the entire length thereof, but not the entire width thereof, as explained above The inner support frame section 70 includes a plurality of vertically disposed brace plates 74 supported by a lower frame bearing plate 76. Connecting adjacent brace plates 74 to each other are stronger supports 83 which add structural support to the rear area of the frame. The pair of outer supporting frame sections 72, 72 include inner and outer vertically disposed side walls 78, 80 respectively which extend substantially normal to and engage the vertically disposed brace plates 74 of the inner supporting frame section 70. Both of said outer supporting frame sections 72, 72 also include vertically disposed brace elements 82 which extend substantially normal to and between the inner and outer vertically disposed side walls 78, 80 respectively of the outer supporting frame sections 72, 72. The axles of the rear pneumatic tires 18 support the outer supporting frame sections 72, 72, as seen in FIG. 6, and thus undergird and support the under supporting structure 64 and upper main bearing plate 56 of the main bed frame 24.

In order to maximize structural support for stress and loads to the main bed frame 24 by the crane boom superstructure 28, the vertically disposed brace plates 74 of the inner supporting frame section 70 are longitudinally offset relative to the vertically disposed brace plates 82 of the outer supporting frame sections 72, 72.

From the foregoing, it will be appreciated that improved strength against torsional and bending stress and loads is provided for the main bed frame of a vehicle as a truck mounted railroad crane, which supports a crane cab and crane boom superstructure throughout the range of movement thereof.

I claim:

1. A main bed frame for a truck mounted railroad crane comprising an upper main bearing plate upon which the crane is mounted, and having wheel means underlying the main bed frame, an inner supporting frame section separating a pair of outer supporting frame sections, all of which underlie and support the upper main bearing plate for substantially the entire length thereof, the inner supporting frame section having a plurality of vertically disposed brace plates supported by a lower frame bearing plate, the pair of outer supporting frame sections each having a rectangular cross section configuration with inner and outer vertically disposed side walls, which extend normal to the vertically disposed brace plates, the inner vertically disposed side walls of the outer supporting frame sections being in engagement with the vertically disposed brace plates of the inner supporting frame section, and a plurality of vertically disposed brace elements extending normal to and between the inner and outer vertically disposed side walls of the outer supporting frame sections, the vertically disposed brace elements of the outer supporting frame sections have a length greater than the vertically disposed brace plates of the inner supporting frame section.

2. The main bed frame as defined in claim 1 wherein the vertically disposed brace plates of the inner supporting frame section are offset relative to the vertically disposed brace elements of the outer supporting frame sections.

3. The main bed frame as defined in claim 2 wherein the upper main bearing plate tapers inwardly on each side of the central portion thereof to the opposite ends thereof.

4. The main bed frame as defined in claim 3 including tie-bar supports underlying the upper main bearing plate in the central portion thereof and being supported by the outer vertically disposed side walls of the outer supporting frame sections.

* * * * *